July 28, 1970 J. W. IRELAND 3,521,754
FILTERING BAG AND CONTAINER THEREFOR
Original Filed Sept. 7, 1967 2 Sheets-Sheet 1

INVENTOR.
JACK W. IRELAND
BY *Freeman & Taylor*

ATTORNEYS

United States Patent Office 3,521,754
Patented July 28, 1970

3,521,754
FILTERING BAG AND CONTAINER THEREFOR
Jack W. Ireland, 664 Merriman Road,
Akron, Ohio 44303
Continuation of application Ser. No. 666,184, Sept. 7, 1967. This application Sept. 17, 1969, Ser. No. 865,226
Int. Cl. B01d 33/00
U.S. Cl. 210—359
2 Claims

ABSTRACT OF THE DISCLOSURE

A filtering bag that includes a resilient sleeve that is impervious to air and moisture and has provided therein a filter in the form of an appendage that is appropriately shaped so as to permit the application of external forces on the filter so as to thus create a withdrawal force on the bag contents.

RELATED APPLICATIONS

This application is a continuation of applicant's earlier filed application for Filtering Bag and Container Therefor, filed Sept. 7, 1967 as Ser. No. 666,184, now abandoned.

In applicant's copending application, Ser. No. 578,807 filed Sept. 12, 1966 and now U.S. Pat. 3,462,019 and entitled Mixing and Filtering Bag there was disclosed a bag with an integral filter member that performed the dual function of serving, first, as an admixing chamber and second, upon alteration of the bag to expose the filtering portion, as a bag that could then be used for the purpose of straining the mixture.

While the bag of the aforesaid application has enjoyed commercial success, the fact remains that use of the same is, of necessity, a "one time" proposition in view of the fact that the ability of the bag to store the zinc powder is destroyed when the filtering portion is exposed for the purpose of straining the slurry at the point of application.

BACKGROUND OF THE INVENTION

Field of the invention

As mentioned in the related application above referred to, the application of zinc coating under field conditions creates certain problems. First, it has always been deemed necessary to admix the powder and solution at the point of application and as mentioned in the related application, admixing under field conditions causes certain problems due to the peculiar nature of the product that is involved.

Specifically, in the admixing step there is a tendency of the powder to agglomerate into a lumpy solution and it has been found that if an admixture containing these lumps or agglomerates are applied to a surface without being properly dissolved, that the same will immediately deteriorate and leave voids in the coating so as to destroy the over-all effectiveness thereof.

To overcome this, it has been deemed necessary to employ straining means of various types and as mentioned in the related application, applicant's first concept envisioned the use of a multi-purpose bag that not only could serve as the medium for admixing the powder and the solution, but could further serve as the medium for subsequently straining this admixture or slurry into a container so as to avoid the presence of agglomerate therein.

DESCRIPTION OF THE PRIOR ART

In addition to the prior art patents set forth in applicant's related application, applicant's own prior application above identified in the related application portion of this specification is considered to be part of the pertinent prior art.

SUMMARY OF THE INVENTION

Applicant's filtering bag consists of a flexible body portion that has an open portion thereof connected to a filtering appendage with the flexibility of the body and filter portions being important to proper operation of the unit.

In this regard, the filter must be of sufficient size and shape so as to permit the application of externally applied forces thereon that operate to withdraw the contents of the bag through the filtering portion.

In the preferred form of the invention, the bag is shown coacting with the rigid container, with the walls of the bag engaging the walls of the container so as to create a suction force beneath the bag, with such force being applied externally of the filter so as to cause removal of the contents from the bag.

Alternatively and by properly shaping the filtering portion in the form of an appendage as shown in the modified form of the invention, a kneading force can be applied by the fingers of an operator so as to break down the agglomerates and force the same manually through the filtering member.

As a still further modification of the invention, it is contemplated that either the preferred form of the invention or the first modification that will be described can be used in combination with another bag that surrounds the same so as to prevent discoloration of the can interior.

Production of an improved filtering bag and container therefor accordingly becomes the principal object of this invention with other objects thereof becoming more apparent upon a reading of the following brief specification, considered and interpreted in the light of the accompanying drawings.

DESCRIPTION OF THE PREFERRED EMBODIMENT

Figure 1:
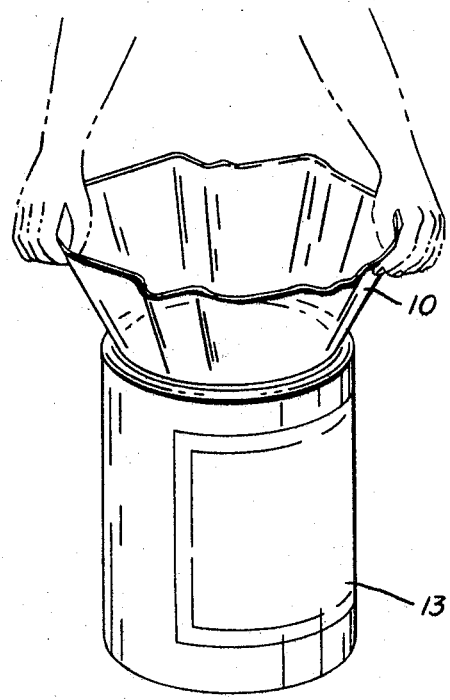
FIG. 1 is a perspective view of the container and bag during the filtering step wherein the slurry is being withdrawn into the container from the interior of the filtering bag.
Figure 3:
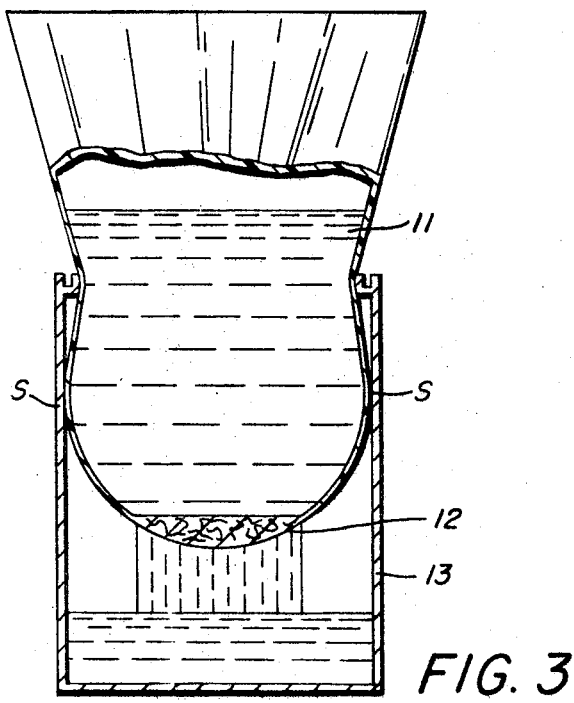
FIG. 3 is a sectional view showing the filtering bag in operation in the approximate position of FIG. 1.

Referring now to the drawings and in particular to FIG. 1, the improved moisture proof filtering bag, generally designated by the numeral 10, is shown having contained therein an admixture of zinc and liquid solution designated by the numeral 11 (FIG. 3) with this solution filtering through the straining portion 12 of the filtering bag 10 so as to be deposited in fully dissolved condition within the interior of the container 13 as clearly shown in FIG. 3 of the drawings.

In the preferred embodiment of the invention, the container 13 is generally cylindrical with an open top and is provided with a removable cover 14 that closes off the top opening thereof so as to thoroughly seal the bag 10 and the zinc powder 14a therein during the period of shipment. In this way, the bag 10 and zinc powder 14a can be shipped as a unit within container 13. In this regard, it will be noted that the bag 10 is folded over as at 10a in the upper region thereof with the freestanding height of the bag being preferably greater than the height of the container 11 so as to permit admixing and withdrawal as shown in FIG. 1 as will be described more fully below.

By way of further description of the bag 10, it will be noted that best results are usually obtained by using a bag of plastic-like material such as polyethylene, polyvinyl chloride or like material depending upon the particular substance being provided in the bag and further being dependent upon the particular solvent employed, with selection of the exact bag material being a matter of choice to the user, insolong as the same remains flexible enough to create a seal in the peripheral point of contact with the contents or has sufficient resiliency to permit kneading of the material thereto as will hereinafter be described.

In this regard, filter or straining means 12 are shown located in the bottom of bag 10 and is of mesh material. It has been found that best results can be obtained by utilizing material which ranges from 20 to 80.

Figure 2:
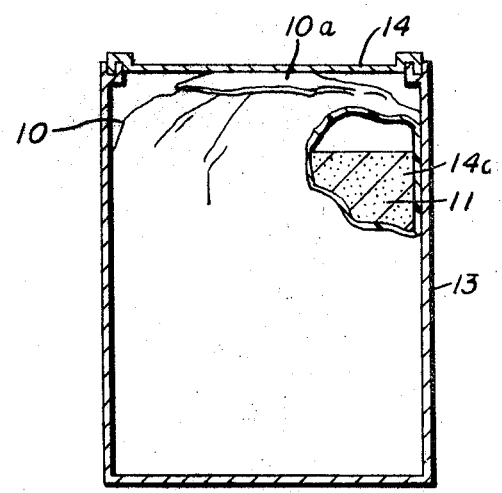
FIG. 2 is a sectional view showing the bag received within the container and further illustrating the presence of the zinc powder interiorly of the bag.

In use or operation of the improved bag 10 and container 13 therefore, the same will be received at the site of use in the approximate condition shown in FIG. 2 whereupon the cover 14 will be removed from container 13 and the bag portion 10a unfolded so as to permit the reception of a liquid solution therein.

The solution so received will then be admixed by hand to the best extent possible and following this, the user will merely secure the container 13 to the floor in any desired manner and then lift the upper edges of the bag 10 upwardly as shown in FIG. 1 so as to initiate withdrawal of the bag and its contents from the container. By this action, a pressure head is created by the weight of the admixture which will expand the bag into contact with the wall of container 13 at the point S and a seal will thus be created at that point which, in turn, results in a vacuum being formed beneath the partially withdrawn bag 10 and the bottom of container 13 as shown in FIG. 3. The presence of this vacuum creates a downward force or pull on the slurry so that further withdrawal of the admixture or slurry is effectuated and additional amounts of the slurry will be pressed through the strainer or filter 12 so as to ultimately empty the contents thereof into the container where the same are ready for application to metal surfaces under field conditions.

It should be noted here that, due to the relative size of the filter 12 and bag 10, the slurry is funnelled into the filter and a continuous washing action occurs as the bag 10 is withdrawn from container 13. Thus any agglomerates caught on filter 12 will tend to be dissolved by said washing action.

It should also be noted that the flexibility of bag 10 is important in order to permit it to expand into contact with container 13 to form seal S. If bag 10 is either too flimsy or rigid, the desired seal cannot be obtained.

In addition to the utilization of the bag and container in the manner described above, in some instances it may be desirable to reuse the container 13 and in this case, a second bag of relatively thin sheet material can be inserted into the container. The bag 10 is then inserted within this bag in the manner shown in the drawings.

In operation of this form of the invention, after the solution has been added to the powder, the bag 10 will be withdrawn from the container in the manner described above. The slurry will pass through the filtering means 12 and the vacuum created by the withdrawal of the bag 10 will retain the second bag in place. After complete withdrawal of bag 10, a completely mixed solution will be present in the container and may be used as desired. When this slurry has been expended, the second bag can merely be removed and thrown away and the container 13 will be clean for additional use.

Figure 4:
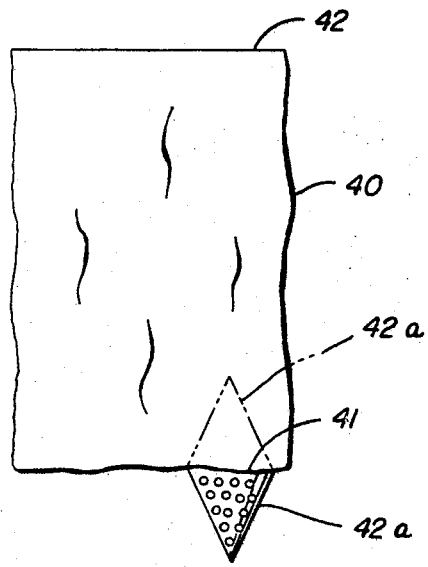
FIG. 4 is an elevational view of the modified form of the invention.

In the modified form of the invention shown in FIG. 4, the bag 40 has an opening 41 provided in the lower corner thereof in opposition to the upper open end 42.

Stitched or otherwise secured to this opening is a funnel shaped filter member 42a that may be invaginated into the bag during periods of nonuse. In periods of use, however, the filter 42a will be extended to the position shown in FIG. 4 so that the same is in the form of an appendage that may be manipulated exteriorly by the fingers of an operator so as to force the entrapped contents of the filter outwardly from the interior of the bag. During periods of nonuse, the filter may be folded inwardly to the chain-dotted line position shown in FIG. 4, so as to prevent destruction thereof.

Figure 5:
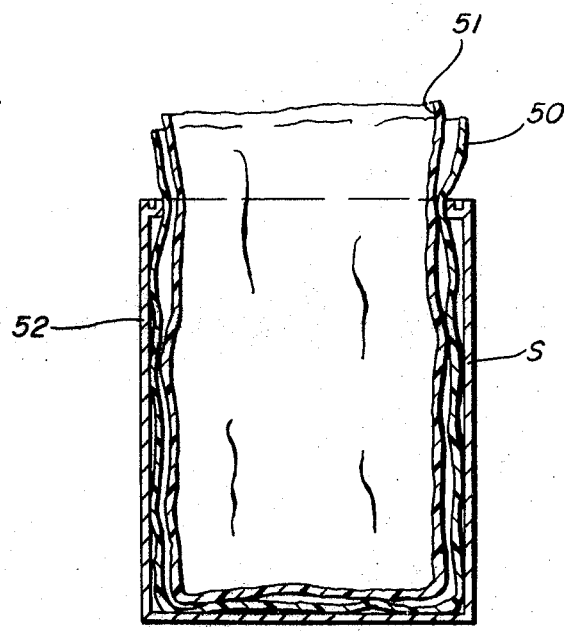
FIG. 5 is a sectional view of a still further modified form of the invention.

Turning next to the modified form of the invention shown in FIG. 5 of the drawings, the same merely envisions the use of a protective bag 50 that has an enveloping relationship to the filtering bag 51. In this regard, the bag 51 may be either of the type shown in FIGS. 1 to 3 or may be of the type shown in FIG. 4 and the purpose of the bag 50 is merely to have the contents of the filtering bag 51 received therein followed by removal from the can 52. By this arrangement, the can interior is protected and may be continually reused due to the fact that the interior wall surfaces thereof will not be harmed by the material being received therein.

Figure 6:
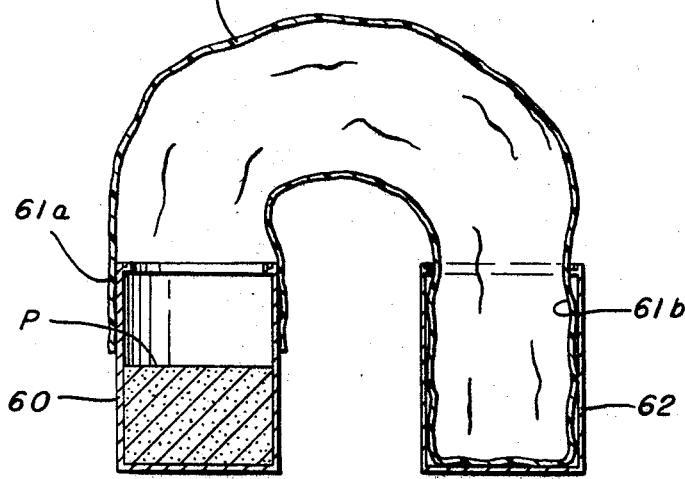
FIG. 6 is a schematic ilustration of the pouring operation.

With reference to FIG. 6, it will first be assumed that the container 60 is the container with the zinc powder therein, with the powder P filling approximately one-half of the contents of the container as shown in FIG. 6.

The open end 61a of the bag 61 is then placed in encircling relationship to the upper edge of the can 60 with the closed and filtering end 61b of the bag 61 being received in the can 62 as shown in FIG. 6.

With both cans seated on the ground, it is merely necessary for the operator to lift the can 60 and dump the contents thereof into the portion 61b that is received within the container 62. Admixing can then be undertaken followed by removal of the portion 61b from can 62 so as to cause the admixture to be strained therethrough as has previously been described.

It will be seen from the foregoing that there has been provided a new and improved type of filtering bag that is characterized by the unique combination of a bag body portion and a filtering portion provided therein so as to permit straining of the bag contents exteriorly thereof following the usual admixture.

While the straining components have, in all instances, been indicated as being employed, it is to be understood that the straining material per se could be replaced by a series of perforations, slits or cuts that would similarly serve to strain the material to the appropriate degree of fineness that is required. Similarly, while the bag has been shown particularly adapted to the filtering of zinc powder, it is to be understood that, by like token, other materials could be used without departing from the spirit of this invention.

Accordingly, modifications of the invention may be resorted to without departing from the spirit hereof or the scope of the appended claims.

What is claimed is:
1. In combination;
   (A) a circular container having an open top;
   (B) a first flexible air impervious bag carried by said container;
   (C) a second flexible air impervious bag carried by said container within said first bag and having
      (1) a freestanding height normally greater than the freestanding height of said container, and
      (2) an expanded diameter greater than the internal diameter of said container and
      (3) a strainer component adapted to communicate the interior of said bag with the exterior of said bag at a point beneath the point of contact between said expanded bag and said interior wall of said container when said bag is filled with liquid.
2. A filtering and mixing bag and container for ad- mixing powder and liquid of the character described, comprising;
- (A) a flexible pliant bag having an open top end and a substantially closed bottom end;
- (B) a rigid container of sufficient size to completely receive said bag interiorly;
- (C) a filter component on the bottom end of said bag;
- (D) said bag
  - (1) having a freestanding height greater than the height of said container
  - (2) having an expanded diameter greater than the internal diameter of said container whereby said admixture will expand said bag into sealing contact with said container during withdrawal of said bag from said container
  - (3) a vacuum being formed beneath said bag during said withdrawal
    - (a) whereby said admixture will be pulled from said bag through said filter and into said container as a result of said vacuum.

References Cited

UNITED STATES PATENTS

| | | | |
|---|---|---|---|
| 1,386,340 | 8/1921 | Wuster | 210—359 |
| 1,706,250 | 3/1929 | Palmer | 210—359 |
| 2,794,553 | 6/1957 | Colarusso | 210—282 X |
| 3,224,586 | 12/1965 | Wade | 210—477 X |
| 3,380,888 | 4/1968 | Numerof et al. | 210—282 X |

SAMIH N. ZAHARNA, Primary Examiner